(12) United States Patent
Bartels et al.

(10) Patent No.: US 6,539,756 B2
(45) Date of Patent: Apr. 1, 2003

(54) STEERING WHEEL LOCK

(75) Inventors: Markus Bartels, Mülheim (DE); Stefan Armbruster, Heiligenhaus (DE)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 09/924,388

(22) Filed: Aug. 8, 2001

(65) Prior Publication Data

US 2002/0069683 A1 Jun. 13, 2002

(30) Foreign Application Priority Data

Aug. 10, 2000  (DE) .......................... 100 39 839

(51) Int. Cl.$^7$ ................................. F16C 3/00
(52) U.S. Cl. .............................. 70/186; 70/182; 70/183; 70/252
(58) Field of Search .................. 70/182, 183, 184, 70/185, 186, 252

(56) References Cited

U.S. PATENT DOCUMENTS

| | | | | |
|---|---|---|---|---|
| 3,600,915 A | * | 8/1971 | Corboud ...................... | 70/252 |
| 3,914,967 A | * | 10/1975 | Arman ........................ | 70/252 |
| 3,940,958 A | * | 3/1976 | Kuroki ........................ | 70/186 |
| 4,313,519 A | * | 2/1982 | Lipschutz .................... | 180/270 |
| 4,414,830 A | * | 11/1983 | Maiocco ...................... | 70/252 |
| 4,907,427 A | * | 3/1990 | Armstrong .................... | 70/252 |
| 5,036,686 A | * | 8/1991 | Ichinose ...................... | 70/186 |
| 5,172,576 A | * | 12/1992 | Milton ........................ | 70/185 |
| 5,595,079 A | * | 1/1997 | Myers ......................... | 70/233 |
| 5,632,167 A | * | 5/1997 | Kawachi et al. ............... | 70/186 |
| 5,685,183 A | * | 11/1997 | Hattori et al. ................. | 70/252 |
| 6,354,118 B1 | * | 2/2000 | Frick et al. .................... | 70/186 |
| 6,233,986 B1 | * | 5/2001 | Suzuki et al. .................. | 70/186 |

FOREIGN PATENT DOCUMENTS

| | | | | |
|---|---|---|---|---|
| DE | 86 21 592 | | 11/1986 | |
| DE | 195 35 437 | | 4/1997 | |
| FR | 2575799 A1 | * | 7/1986 | ............ F16D/7/04 |

* cited by examiner

*Primary Examiner*—Anthony Knight
*Assistant Examiner*—Lisa Bannapradist
(74) *Attorney, Agent, or Firm*—Herbert Dubno

(57) ABSTRACT

A steering wheel lock utilizes a motor-driven spindle which drives a locking nut to control a detent disk which has pin-like projections engaged in camming tracks which guide the detent disk linearly and angularly. The detent disk in turn controls a locking pin which can engage the steering wheel shaft.

11 Claims, 3 Drawing Sheets

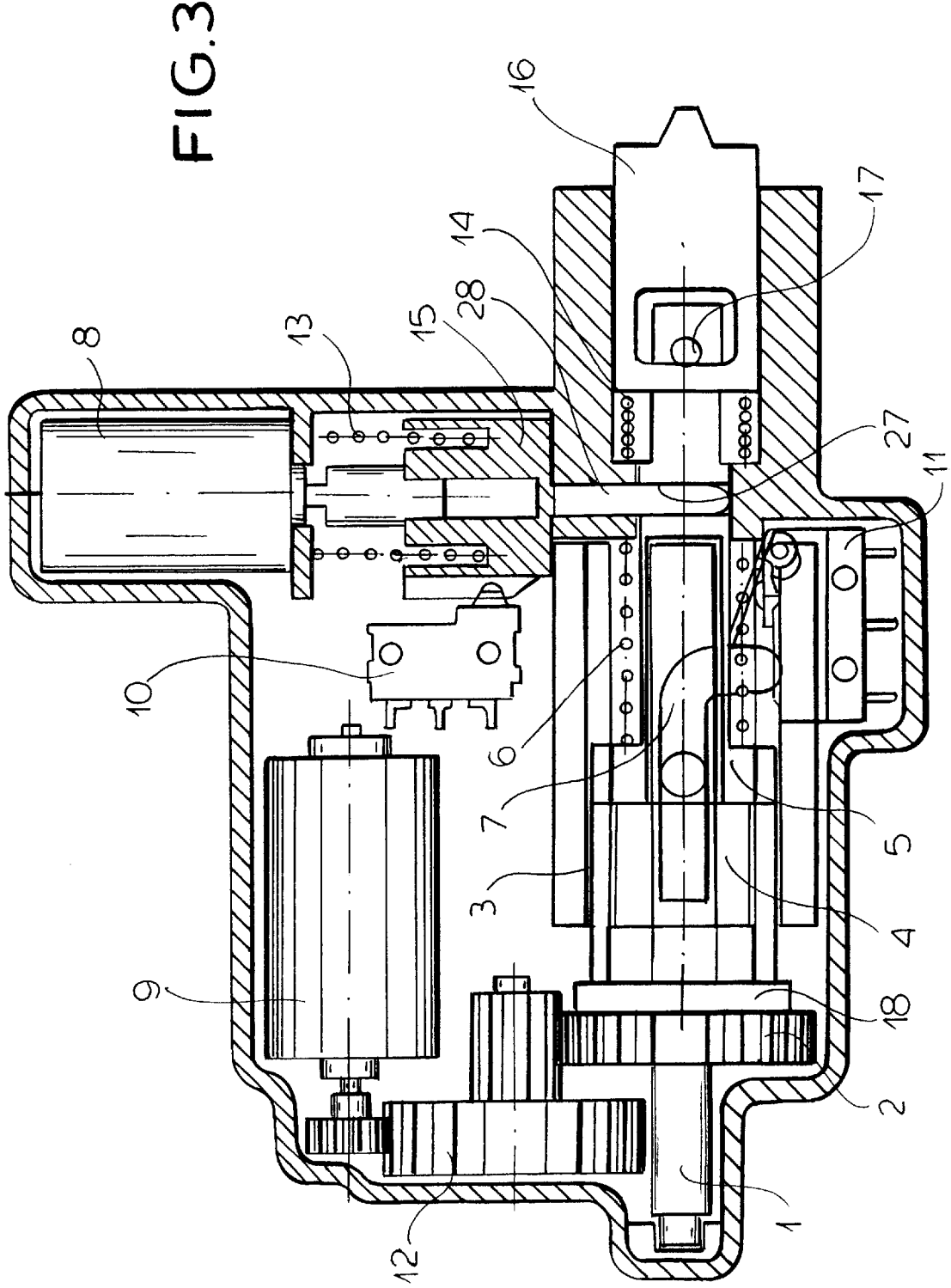

STEERING WHEEL LOCK

FIELD OF THE INVENTION

Our present invention relates to a steering wheel lock.

BACKGROUND OF THE INVENTION

In German patent document DE 86 21 592 U1 and DE 195 35 437 A1, actuators for locks are described which are particularly suitable for use in automotive vehicle applications, e.g. for door locks, and which utilize a lock actuator in the form of an electric motor and gearing connecting that motor with the mechanical lock unit.

Motor vehicles frequently require, in addition, steering wheel locks which prevent rotation of the steering wheel until an ignition key is inserted into the ignition switch and/or an electronic or other unit is actuated in preparation for vehicle operation. In the past problems have been encountered with the relatively long period of time required for unlocking the steering wheel.

OBJECTS OF THE INVENTION

It is, therefore, an object of the present invention to provide an improved steering wheel lock which eliminates the aforedescribed problem with respect to the reaction time in unlocking.

Another object is to provide a steering wheel lock which is compatible with the lock control systems of an automotive vehicle but which can provide rapid transition between locking and unlocking of a steering wheel.

Another object of this invention is to provide a rapidly acting, reliable and simple steering wheel long device which can be actuated electrically and is, therefore, compatible with electrical systems of modern motor vehicles.

SUMMARY OF THE INVENTION

These objects and others which will become apparent hereinafter are attained, in accordance with the invention in a steering wheel lock which has an electrical drive unit for a rotatable spindle on which a nut is axially displaceable by the screwthread of the spindle and which, in turn, entrains a detent disk. The detent disk can be rotated into a locking position to allow the locking pin to block the steering wheel.

The nut can be braced by a spring which rotates the spindle to return the nut into its starting position. That spring can be received in a drive gear for the spindle and can be stressed or tensioned by rotation of the spindle into the locking position and can expand once the spindle has reached its locking position.

The detent disk can have a projection, which can be an extension rib or a pin-like projection engageable in a camming track, e.g. a groove, for displacing the detent disk into its locking position. The groove can have an axial portion transitioning into a transverse portion for effecting rotation of the detent disk upon axial displacement or translation thereof by the nut. The pin can be held in its unlocked position by a latch operated by a latch mechanism and that latch can include a slider whose pin blocks the spindle. More specifically, the steering wheel lock can comprise:

a rotary spindle formed with a thread;

a drive unit operatively connected to the rotary spindle for driving same;

a locking nut on the spindle and engaging the thread;

a detent disk in the spindle entrained by the nut and rotatable from an unlocking position into a locking position upon entrainment by the nut; and a locking pin operated by the detent disk for locking a steering wheel upon rotation of the detent disk from the unlocking position into the locking position.

BRIEF DESCRIPTION OF THE DRAWING

The above and other objects, features, and advantages will become more readily apparent from the following description, reference being made to the accompanying drawing in which:

FIG. 3 is a view similar to FIG. 2 showing the unlocked position; and

FIG. 4 is a diagrammatic end view of a gear provided with a torsion spring which can be used in the system of FIGS. 1–3.

SPECIFIC DESCRIPTION

Figure 1:
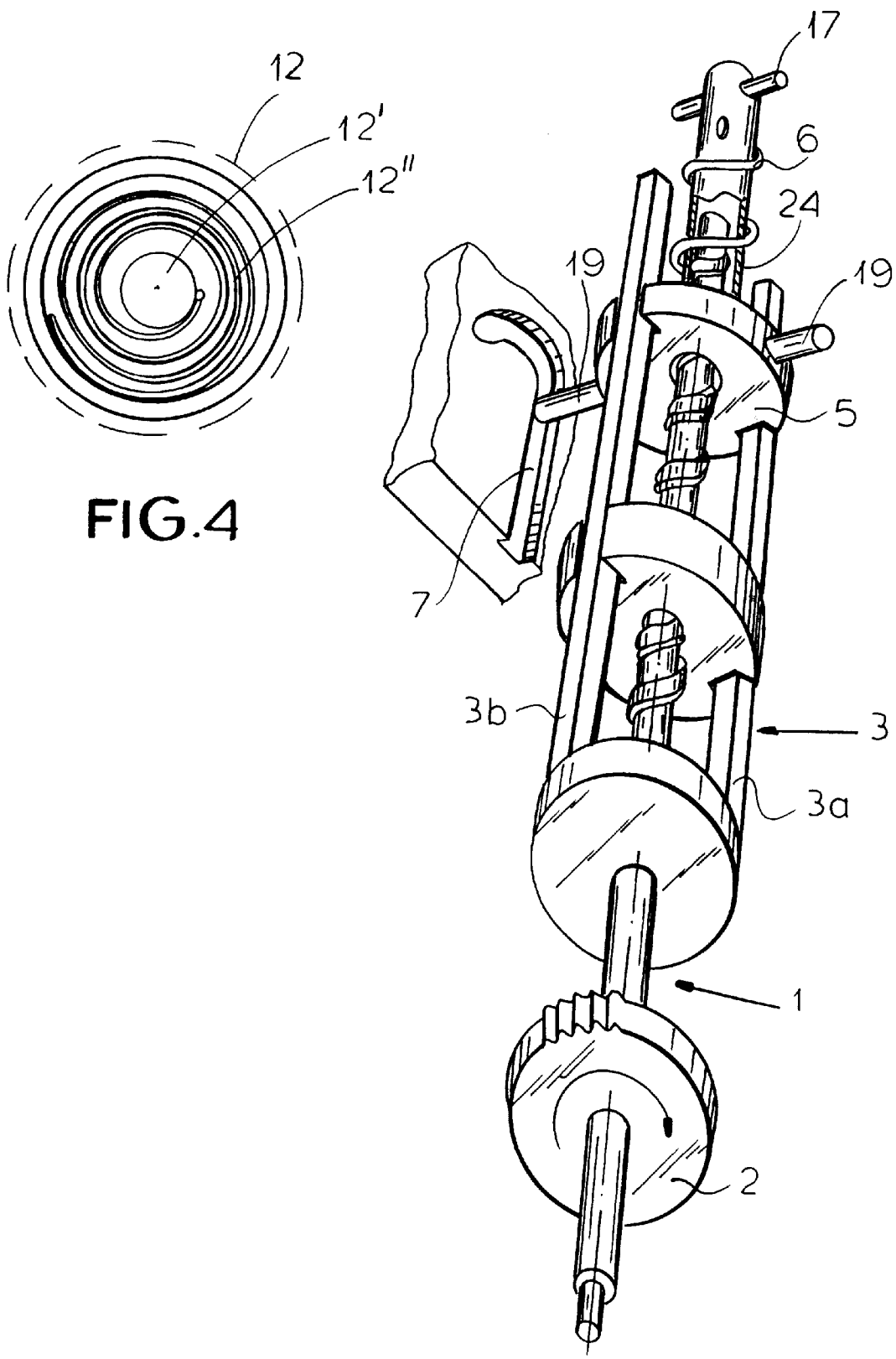
FIG. 1 is a perspective view diagrammatically illustrating various elements of the steering wheel lock according to the invention.

The steering wheel lock shown in the drawing is adapted to lock a steering wheel shaft 20 in a steering wheel column 21 by the engagement of a tooth 22 of a locking pin 16 in a complementary recess or notch 23. When the tooth 22 is withdrawn from the recess 23, the shaft 20 of the steering wheel can rotate to steer the vehicle.

The steering wheel lock itself comprises a spindle 1 with a drive gear 2 keyed thereto and actuated by a drive unit 9, for example, an electric motor.

The lock mechanism also comprises a guide cage 3 within which a lock nut 4 can be displaced in translation, i.e. axially by the spindle 1 onto which the nut 4 is threaded, separately or together with a detent disk 5 when the spindle is rotated.

The detent disk 5 itself is formed with pin-like projections 19 engageable in respective guide tracks 7 for initially enabling translation of the detent disk 5, i.e. axial displacement, and then converting the displacement of the disk 5 into a rotation, in the illustration in FIG. 1, a rotation in the clockwise sense.

The detent disk 5 can be formed with a tubular extension 24 which terminates in a rod 25 carrying the connecting pin 17 and engaging in windows 26 of the locking pin 16. The rod 25 has a bore 27 which cooperates with a latching pin 28 of a slider 15 in a manner to be described subsequently.

Figure 2:
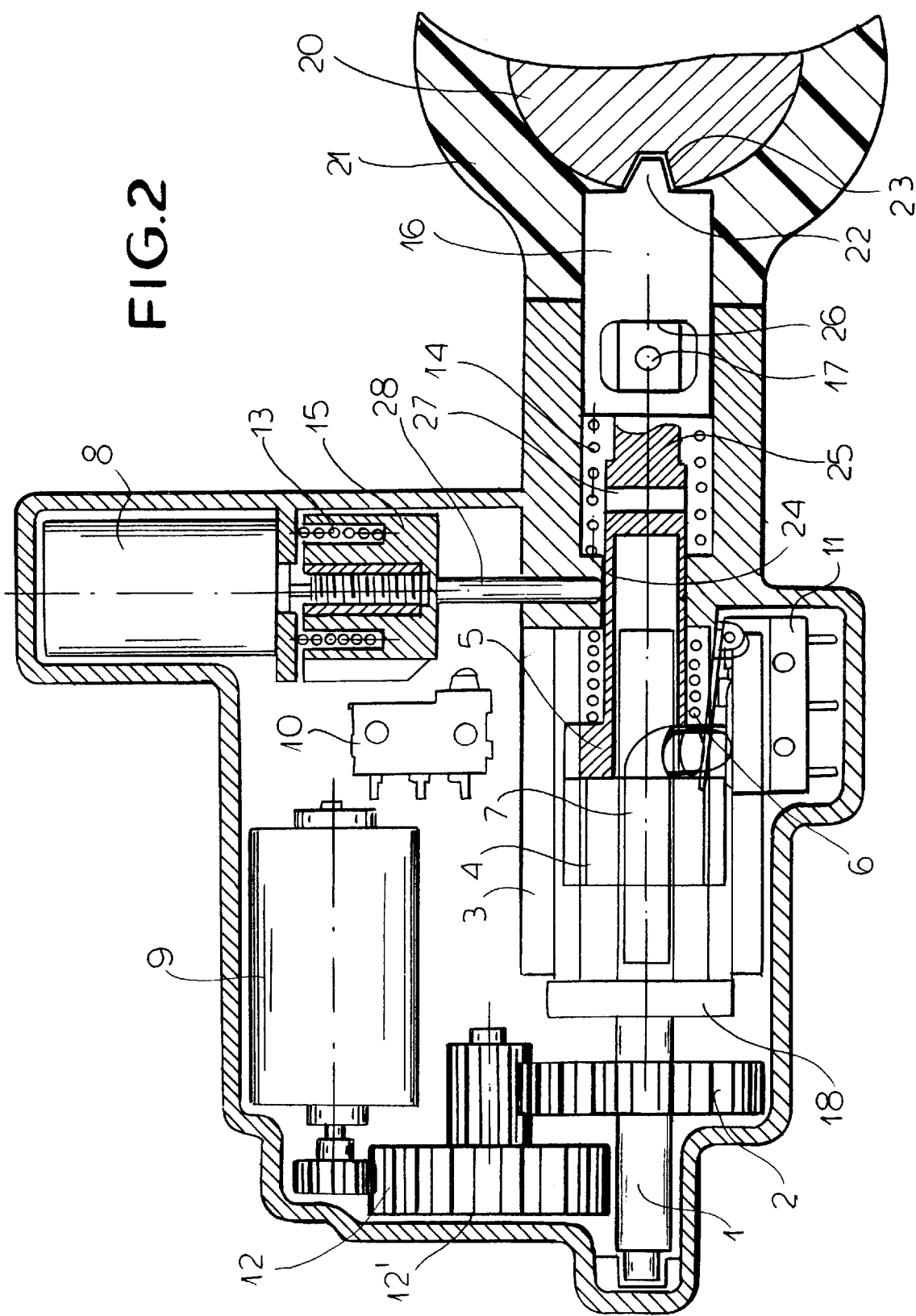
FIG. 2 is a schematic longitudinal section through a steering wheel lock using those elements and showing the parts in the locked position of the steering wheel.

The connecting pin 17 cooperates with a compression spring 14 and the locking pin 16 so that the spring 14 will bias the locking pin 16 to the right against the connecting pin 17 (FIG. 3) so that, when the compression spring 14 is relieved, the locking pin 16 will jump into engagement with the steering wheel (FIG. 2). The pin 17 can, in the unlocking position, pull the pin 16 against the force of the spring 14.

The compression spring 6, in addition, biases the detent disk 5 against or toward the nut 4 and to the left as shown in FIGS. 2 and 3. The spring 6 has been illustrated diagrammatically in FIG. 1. The spring 6 is compressed in the locked position of the device (FIG. 2).

Upon energization of the drive unit 9, i.e. the electric motor, the spindle 1 is driven via the gear 2 and an intervening gear train including a gear 12 which can be equipped, as shown in FIG. 2, with a torsion or spiral spring 12' within the interior of the gear 12 and anchored at one end of the gear 12 and at an opposite end to a shaft 12" on which the gear 12 is mounted. The spiral spring 12' is thus wound up or tensioned by the rotation of the gear 12 which displaces the spindle 1 to bring the pin 16 into engagement with the steering wheel shaft 20 so that, with deenergization of the motor 9, the gear 12 will automatically rotate in the opposite direction and therefore automatically return the spindle 1 to its original position. The system thus operates in accordance with the shuttle principle.

The energization of the electric motor 9 can be effected by the displacement of the ignition key into its locked position in the usual ignition cylinder of the vehicle, by withdrawal of the ignition key from the ignition cylinder or by a like final action in shutting down the vehicle. When the vehicle is equipped with a so-called keyless entry system, the energization of the motor 9 can be terminated by a shutdown of the electrical system by the actuation of a push button or the intervention of some electronic control unit for activating the locks of the vehicle.

Whatever the mode of activation or deactivation of the motor 9, it should be evident that upon withdrawal of the ignition key, the steering wheel will be in its locked position and/or upon cut-off of the engine, the electric motor 9 will be activated sufficiently to allow locking of the steering wheel.

Upon rotation of the steering wheel locking spindle 1 in the clockwise sense, the plate 18 and the cage 3 are moved from a position proximal to the gear 2 away from the latter (see the transition from FIG. 3 to FIG. 2). The bars 3a and 3b ensure angularly entrained together. During the initial translation of the disk 5, entrained by the nut 4, the pins 19 are moved within the axially-extending portions of the track 7 and the spring 6 is compressed. The pin 17 shifts to the right, whereupon the spring 14 biases the pin 16 into engagement with the steering wheel shaft 20. The disk 5 is retained in the locking position by a twist imparted to the disk 5 and the cage and caused by the bent part of the tracks 7 engaging the pins 19.

The rotation in the clockwise sense induced by the bent portions of the track is about 30°. The cage is held axially by the engagement of the pins 19 in the bent portion and that maintains the positions of the elements shown in FIG. 2 which correspond to the locking position.

After shutdown and deenergization of the electric motor, the spindle 1 is rotated back into its starting position by the spring 12" and simultaneously the nut 4 is shifted axially to the left (compare FIGS. 2 and 3) into its starting position. The detent disk 5 and the cage, however, remain in their positions shown in FIG. 2 in spite of the return of the nut to its starting axial position and as long as the locked position is to be maintained.

The unlocking is effected by insertion of the ignition key into the ignition cylinder or the actuation of the unlocking button of a central control system or some other initiation of the energization of the motor 9 which will drive the spindle 1 once again in the counterclockwise sense (as opposed to the clockwise sense in which the locking is effected). With this movement, the cage 3 and the nut 4 are moved toward the gear 2 and the cage is angularly displaced to shift the pins 9 out of the bends of the track 7 and enable the spring 6 to displace the detent plate 5 toward the nut 4. The result is an especially rapid unlocking by entrainment of the pin 16 with the detent disk 5 under the action of the spring 6.

Once the assembly is in its unlocked position with the tooth 22 retracted from the notch 23, another electric motor drive or solenoid 8 can be released to permit the spring 13 to drive the slider 15 downwardly so that the pin 28 will engage in the bore 27 and latch the assembly in its unlocked position.

The engagement of the pin 16 with the steering wheel 20 can also utilize an angular displacement of the pin 16 to lock the pin to the steering wheel 20 by a bayonet-like action brought about by the bent part of the track 7. The microswitch 10 can be provided to signal the latched position of the steering wheel lock in the position permitting free rotation of the steering wheel while the microswitch 11 can enable the master control system to monitor the steering wheel lock.

We claim:

1. A steering wheel lock comprising:
    a rotary spindle formed with a thread;
    a drive unit operatively connected to said rotary spindle for driving same;
    a locking nut on said spindle and engaging said thread;
    a detent disk free on said spindle to be axially movable along said spindle and entrained by said nut and rotatable from an unlocking position into a locking position upon entrainment by said nut; and
    a locking pin operated by said detent disk for locking a steering wheel upon rotation of said detent disk from said unlocking position into said locking position.

2. The steering wheel lock defined in claim 1, further comprising a spring biasing said locking nut into a starting position upon a reverse rotation of said spindle in the locking position of said detent disk.

3. The steering wheel lock defined in claim 2 wherein said spring is a torsion spring received in a gear wheel coupling said drive unit to said rotary spindle and rotating said spindle in said reverse rotation, said spring being tensioned during rotation of said spindle to displace said detent disk into said locking position and expanding for said reverse rotation of said spindle.

4. The steering wheel lock defined in claim 3 wherein said detent disk is provided with at least one projection guided in a guide track for displacing said detent disk between said locking position and said unlocking position upon axial displacement of said detent disk.

5. The steering wheel lock defined in claim 4 wherein said detent disk, upon axial displacement into said locking position is then rotated and is moved in an opposite direction for displacement into the unlocking position.

6. The steering wheel lock defined in claim 5, further comprising a latching drive provided with a latch slide for blocking said pin upon unlocking of said steering wheel.

7. The steering wheel lock defined in claim 6 wherein said latch slide prevents rotation of said spindle.

8. The steering wheel lock defined in claim 1 wherein said detent disk is provided with at least one projection guided in a guide track for displacing said detent disk between said locking position and said unlocking position upon axial displacement of said detent disk.

9. The steering wheel lock defined in claim 4 wherein said detent disk, upon axial displacement into said locking position is then rotated and is moved in an opposite direction for displacement into the unlocking position.

10. The steering wheel lock defined in claim 1, further comprising a latching drive provided with a latch slide for blocking said pin upon unlocking of said steering wheel.

11. The steering wheel lock defined in claim 10 wherein said latch slide prevents rotation of said spindle.

* * * * *